United States Patent [19]

Duquesne et al.

[11] 3,997,728
[45] Dec. 14, 1976

[54] UNIT FOR THE SIMULTANEOUS SWITCHING OF DIGITAL INFORMATION AND SIGNALLING DATA IN P.C.M. TRANSMISSION SYSTEMS

[76] Inventors: Jean F. Duquesne, 32, Rue Lafontaine, Paris, France, 75016; Michel M. Rouzier, Saint Quay Perros; Maurice J. Revel, Rue de Lanneg-Braz, both of Perros-Guirec, France, 22700; Olivier F. Louvet, 82, Residence Corlay, Lannion, France, 22300

[22] Filed: Aug. 25, 1975

[21] Appl. No.: 607,486

[30] Foreign Application Priority Data

Aug. 30, 1974 France .............................. 74.29670

[52] U.S. Cl. ...................... 179/15 BY; 179/15 BS
[51] Int. Cl.[2] .......................................... H04J 3/06
[58] Field of Search ...... 179/15 BS, 15 BY, 15 BA; 178/69.5

[56] References Cited
UNITED STATES PATENTS

| 3,564,144 | 2/1971 | Diggelmann et al. | 179/15 BY |
| 3,794,773 | 2/1974 | Jacob et al. | 179/15 BS |

*Primary Examiner*—Thomas W. Brown

[57] ABSTRACT

A switching unit for a multiplex pulse code modulation transmission system formed of incoming and outgoing multiplex digital circuits divided into a number of frame locking, information and signalling time slots. The information time slots are grouped in frames and contain information octets and the signalling time slots are grouped in multiframes and contain two signalling demi-octets. A transmission channel is defined by the recurrent information time slots having a given serial number in the frame and the octets contained therein and the recurrent signalling time slots having a given serial number in the multiframe and the first or the second demi-octets contained therein. The switching unit of the invention switches both the information octets and the signalling demi-octets of a selected transmission channel. Switching comprises writing and reading the information octets in and out of information buffer stores and writing and reading the signalling demi-octets in and out of signalling buffer stores. Since there are two demi-octets and only one octet per frame, the reading rate would have to be two times higher for the signalling than for the information. The reading rate is equalized for both information and signalling switching by reading the signalling demi-octets during both the frame locking time slots and the signalling time slots.

3 Claims, 6 Drawing Figures

UNIT FOR THE SIMULTANEOUS SWITCHING OF DIGITAL INFORMATION AND SIGNALLING DATA IN P.C.M. TRANSMISSION SYSTEMS

The present invention relates to a switching unit for multiplex digital channels and, more particularly, a unit ensuring at the same time the transfer of the digital information and of the digital signalling pertaining to a channel of an incoming multiplex digital circuit to a channel of an outgoing multiplex digital circuit.

The main object of the invention is to switch from multiplex digital circuits of a digital transmission network to other multiplex digital circuits of this network, the digital information and signalling of selected channels of the circuits in such a manner that these circuits are utilized in the vicinity of their maximum capacity, or in other words to increase the filling coefficient of multiplex digital circuits. It is known that for multiplex digital circuits having a rate of 2.048 MHz, known as TN1 circuits, this capacity is thirty digital channels, two of the thirty-two channels which these circuits comprise being assigned to the frame locking and to the signalling.

It is known that in multiplex pulse code modulation transmission systems, the multiplex digital circuits generally comprise thirty-two time slots, each of a duration of 3.9 $\mu$s, grouped in frames of 125 $\mu$s, each time slot corresponding to a component digital channel. Each time slot contains an octet of eight bits. It is usual to number from $TS_0$ to $TS_{31}$ the time slots of 3.9 $\mu$s of the frame, each relating to a component digital channel and from $\omega_1$ to $\omega_8$ the time intervals of 500 ns each occupied by one bit of the octet. The time slot $TS_0$ is assigned to a frame locking octet enabling the receiving end to reconstitute the frame. The time slot $TS_{16}$ is reserved for the transmission of the signalling as will be recalled. The time slots $TS_1$ to $TS_{15}$ and $TS_{17}$ to $TS_{31}$ are assigned to the information octets of the thirty multiplexed digital channels.

The frames of 125 $\mu$s are grouped in sixteens in a multiframe of 2 ms. It is usual to number from $FR_0$ to $FR_{15}$ the frames of a multiframe. The time slot $TS_{16}$ of the frame $FR_0$ is assigned to a multiframe locking octet enabling the receiving end to reconstitute the multiframe. The time slots $TS_{16}$ of the frames $FR_1$ to $FR_{15}$ are assigned to the digital transmission of the signalling information. More precisely, the signalling of the digital channels 1 and 17 is contained respectively in the first four bits and in the last four bits of the octet of the time slot $TS_{16}$ of the frame $FR_1$. The signalling of the digital channels 2 and 18 is contained respectively in the first four bits and the last four bits of the time slot $TS_{16}$ of the frame $FR_2$ and so on. The following table shows where the signalling of a digital channel of a given number is contained in the multiframe:

network, to write the octets relating to the component digital channels at the addresses 1 to 31 of a buffer information store then, under the control of a read out control store, to read out these octets at appropriate moments to place them selectively in the time slots of an outgoing multiplex digital circuit. In other words, it is known to switch the digital information octets from one channel of an incoming multiplex digital circuit to one channel of an outgoing multiplex digital circuit. But in time-division switching networks, the question of the transfer of the digital signalling of the channels does not arise because the signalling of the incoming channels is used and processed before the transfer of information from these channels and it is a fresh signalling which accompanies the outgoing channels.

The precise object of the invention is to provide a switching unit which ensures the simultaneous transfer of the information and of the signalling from the channels of an incoming multiplex digital circuit to the channels of an outgoing multiplex digital circuit, although the information and the signalling of one channel do not have either the same digital format (octet for the first, demi-octet for the second) or the same repetition rate (125 $\mu$s for the first, 2 ms for the second).

The invention will now be described in detail with reference to the accompanying drawings in which.

Figure 1:
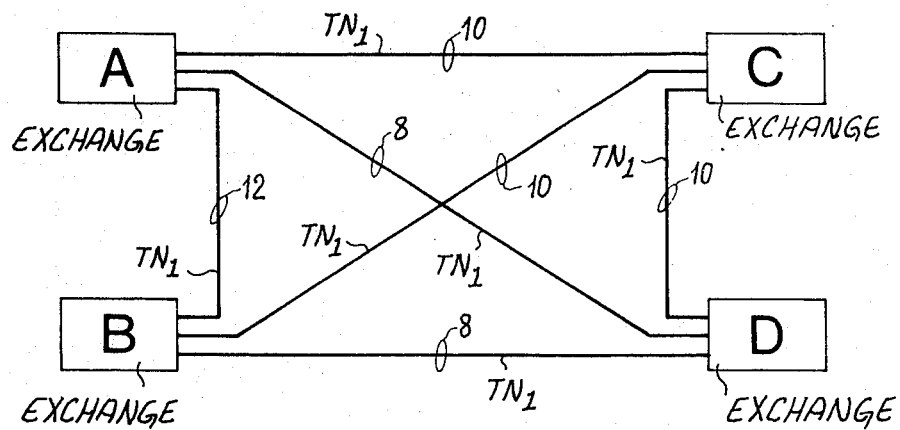
FIGS. 1 and 2 are diagrams of digital connections by multiplex digital circuits showing that the latter are used with an improved filling coefficient as a result of the invention.

FIG. 1 illustrates four time-division telephone exchanges of small or medium capacity, A, B, C, D, connected in pairs by digital circuit TN1, i.e. PCM circuits having a rate of 2.048 MHz. There are therefore six digital circuits TN1 altogether, three of which circuits leave each exchange. Beside each exchange there is shown the number of channels which connect this exchange to each of the others. It will be seen that each circuit TN1 only contains a number of digital channels 8, 10 or 12 much lower than its nominal capacity of 30.

Figure 2:
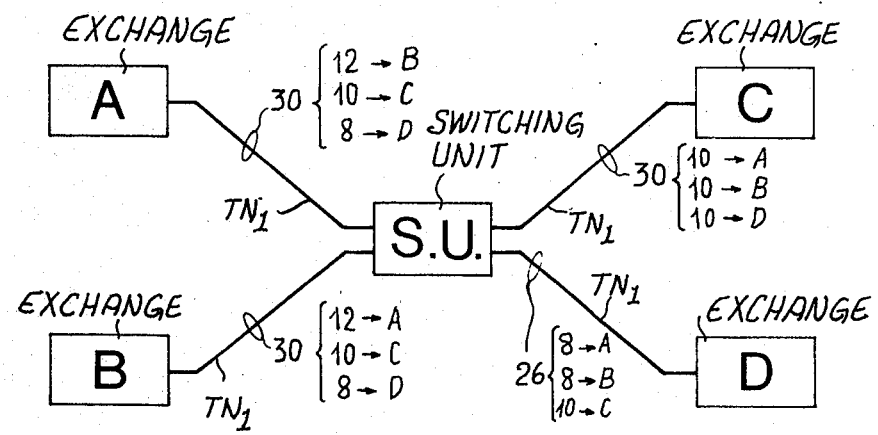

In FIG. 2, on the other hand, all the time-division telephone exchanges A, B, C, D are connected to a switching unit SU by a circuit TN1. The multiplex digital circuits connecting the switching unit SU to the exchanges A, B, C, D are fully utilized (thirty channels for SU-A, SU-B, SU-C), or used with a satisfactory filling coefficient (twenty-six channels for SU-D). There is only a single digital circuit TN1 per exchange and the switching unit SU ensures the transfer of both the information and the signalling from the digital channels according to their destination.

In order to facilitate the explanation of the structure and operation of the switching unit of the invention, it

|  | $TS_{16}$ of $FR_0$ | $TS_{16}$ of $FR_1$ | $TS_{16}$ of $FR_2$ | ... | $TS_{16}$ of $FR_{13}$ | $TS_{16}$ of $FR_{14}$ | $TS_{16}$ of $FR_{15}$ |
|---|---|---|---|---|---|---|---|
| first 4 bits of $TS_{16}$ | locking | No.1 | No.2 |  | No.13 | No.14 | No.15 |
| last 4 bits of $TS_{16}$ | multi-frame | No.17 | No.18 |  | No.29 | No.30 | No.31 |

It is known, in time-division switching networks, to resynchronize the time slots of an incoming multiplex digital circuit with the local clock of said switching will be assumed that the said unit is connected to sixteen multiplex digital circuits marked $I_p$ ($p = 0, 1 \ldots 15$) in the incoming direction and marked $O_q$ ($q = 0, 1 \ldots 15$) in the outgoing direction. Corresponding to each multiplex digital circuit is a switching module, respectively $100_0$ to $100_{15}$. Since these switching modules are identical, only one will be described below.

Figure 3:
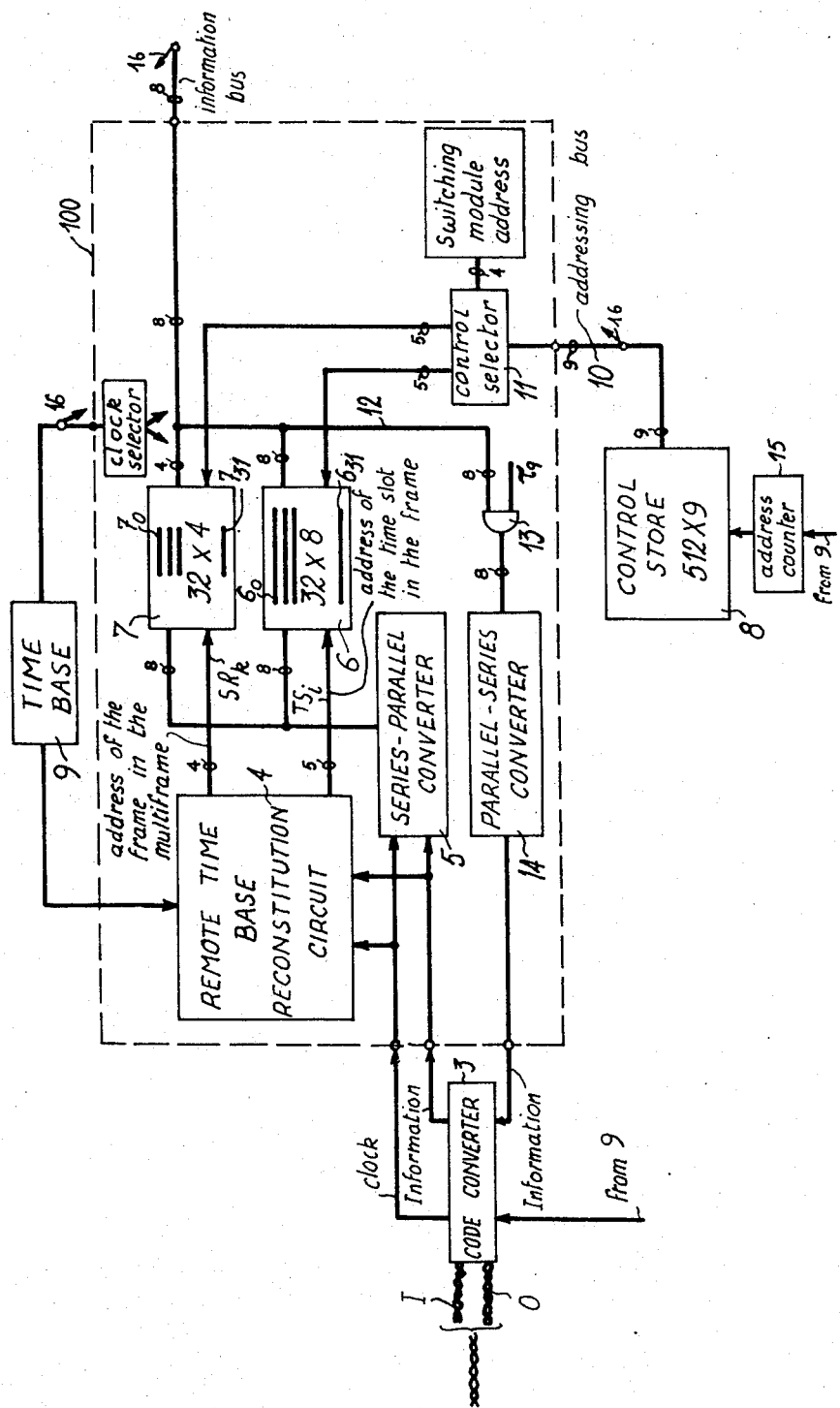
FIG. 3 illustrates the switching unit of the invention in the form of a simplified block diagram.

Referring to FIG. 3, 16 multiplex digital circuits of 2.048 MHz of the type TN1 are connected to the switching unit. Of these sixteen digital circuits, only one is illustrated comprising an incoming digital circuit I and an outgoing digital circuit O. These digital circuits are connected to a code converter 3 which ensures the conversion from the bipolar code used on the line to the binary code used in the switching unit, as well as the reverse conversion.

The code converter 3 is connected on the one hand to a circuit for the reconstitution of the remote time base 4 and to a series-parallel converter 5 which converts the serial octets into parallel octets. The circuit for the reconstitution of the remote time base is synchronized in frame by the frame locking octet and in multiframe by the multiframe locking octet and delivers the addresses in the frame of the time slots $TS_1$ to $TS_{31}$ and the addresses in the multiframe of the time slots $(TS_{16})FR_1$ to $(TS_{16})FR_{15}$. The circuit for the reconstitution of the remote time base 4 and the series-parallel converter 5 are connected respectively to the write-addressing inputs and to the information inputs of two buffer stores 6 and 7. The buffer store 6 is the information store; the channel octets are written there in 32 words of eight bits $6_0 \ldots 6_n \ldots 6_{31}$ (the words $6_0$ and $6_{16}$ are not used) and the information is refreshed there at the frame frequency of 8000 Hz. The buffer store 7 is the signalling store; the channel demi-octets are written there in thirty-two words of four bits $7_0 \ldots 7_n \ldots 7_{31}$ (the positions 0 and 16 are not used) and the signalling is refreshed at the multiframe frequency of 500 Hz.

It results that the incoming information and signalling are written in fixed positions, that is to say that corresponding to each incoming multiplex digital circuit $I_p$ is an information store $6_p$ and a signalling store $7_p$ and corresponding to the digital channel i of the incoming multiplex digital circuit is the word $6_{p,i}$ of the information store and the word $7_{p,i}$ of the signalling store. It may also be said that the stores 6 and 7 are controlled by the output.

The reading of the stores 6 and 7 is controlled by the control store 8 which is addressed step by step by a time base 9 and a selector 15.

At each time slot, 16 octets of information originating from the sixteen incoming multiplex digital circuits are written respectively in the 16 buffer information stores associated with these incoming multiplex circuits.

At each time slot, on the other hand, any 16 octets are read out of the (or some of the) buffer information stores and transferred to the component channels of the outgoing multiplex digital circuits corresponding to this time slot.

At each time slot marked $TS_{16}$, 32 demi-octets of signalling corresponding to 32 information octets are written in the 16 buffer signalling stores associated with the information stores.

At each $TS_{16}$, on the other hand, any 32 demi-octets read out of the signalling stores are transferred to the component channels of the outgoing multiplex digital circuits corresponding to this time slot $TS_{16}$.

In the course of each time slot, therefore, it is necessary to provide 17 intervals of time of which one $\tau_w$ is for the writing and $\tau_w \ldots \tau_j \ldots \tau_{15}$ are for the reading relating to the 16 outgoing multiplex circuits. In one frame, therefore, 512 intervals of time $\tau_0 TS_0 \ldots \tau_{15}TS_0$, $\tau_0TS_1 \ldots \tau_{15}TS_1 \ldots \tau_0TS_{31} \ldots \tau_{15}TS_{31}$ are available, corresponding to the 512 channels altogether of the sixteen outgoing multiplex digital circuits. During $\tau_0TS_1$, the octet which should occupy the time slot $TS_1$ of the outgoing multiplex digital circuit $O_o$ would be read; during $\tau_qTS_j$ the octet which should occupy the time slot $TS_j$ in the outgoing multiplex circuit $O_q$ would be read.

The store 8 comprises 512 words of nine bits and is addressed in a cyclic manner by address selector 15 driven by time base 9, 4 bits serving to define the address p of one incoming multiplex digital circuit out of 16, that is to say the switching module associated with this incoming multiplex digital circuit and five bits serving to define the time slot $TS_i$ in this incoming multiplex digital circuit, that is to say the location of the information octet to be read out of the buffer information store $6_p$ of this module and the location of the signalling demi-octet to be read out of the buffer signalling store $7_p$ of this module.

The control store being addressed in function of $q, j$ emits the address $p, i$:

— $p$, address of the incoming multiplex digital circuit $I_p$;
— $i$, address of the digital channel in $I_p$;
— $q$, address of the outgoing multiplex digital circuit $O_q$;
— $j$, address of the digital channel in $O_q$.

The control store 8 therefore directs 512 items of incoming information towards 512 outgoing channels distributed over 16 outgoing multiplex digital circuits. In fact, this switching of the speech information only occurs in the time slots $TS_1$ to $TS_{15}$ and $TS_{17}$ to $TS_{31}$, the time slot $TS_0$ being reserved for the locking octet over the outgoing multiplex digital circuits, and the time slot $TS_{16}$ being reserved for the signalling.

In each of the sixteen outgoing multiplex digital circuits $O_0$ to $O_{15}$, 32 items of signalling information, each of 4 bits have to be transmitted in the time slots $TS_{16}$ of a multiframe, at the rate of two items of information of four bits per time slot $TS_{16}$. It is therefore necessary to effect, in the course of one time slot, 32 reading operations out of the signalling stores whereas it was only necessary to effect, in the course of one time slot, 16 reading operations out of the information stores. So as not to double the rate of reading during the time slot $TS_{16}$ in relation to its value during the other time slots, the rate of 16 reading operations per time slot is retained, but 16 reading operations are effected during the time slot $TS_0$ and 16 reading operations during the time slot $TS_{16}$.

The control store 8 is connected to the read-addressing terminals of all the stores 6 and 7 of the switching modules by means of an addressing busbar 10 and a control selector 11 and the reading terminals of all the stores 6 and 7 of the switching modules are connected to one another and to the AND-gates 13 by an information busbar 12.

At each time slot, the information or signalling octets are transmitted in series to the code converters 3 after passing through the parallel-series converters 14.

Figure 4:
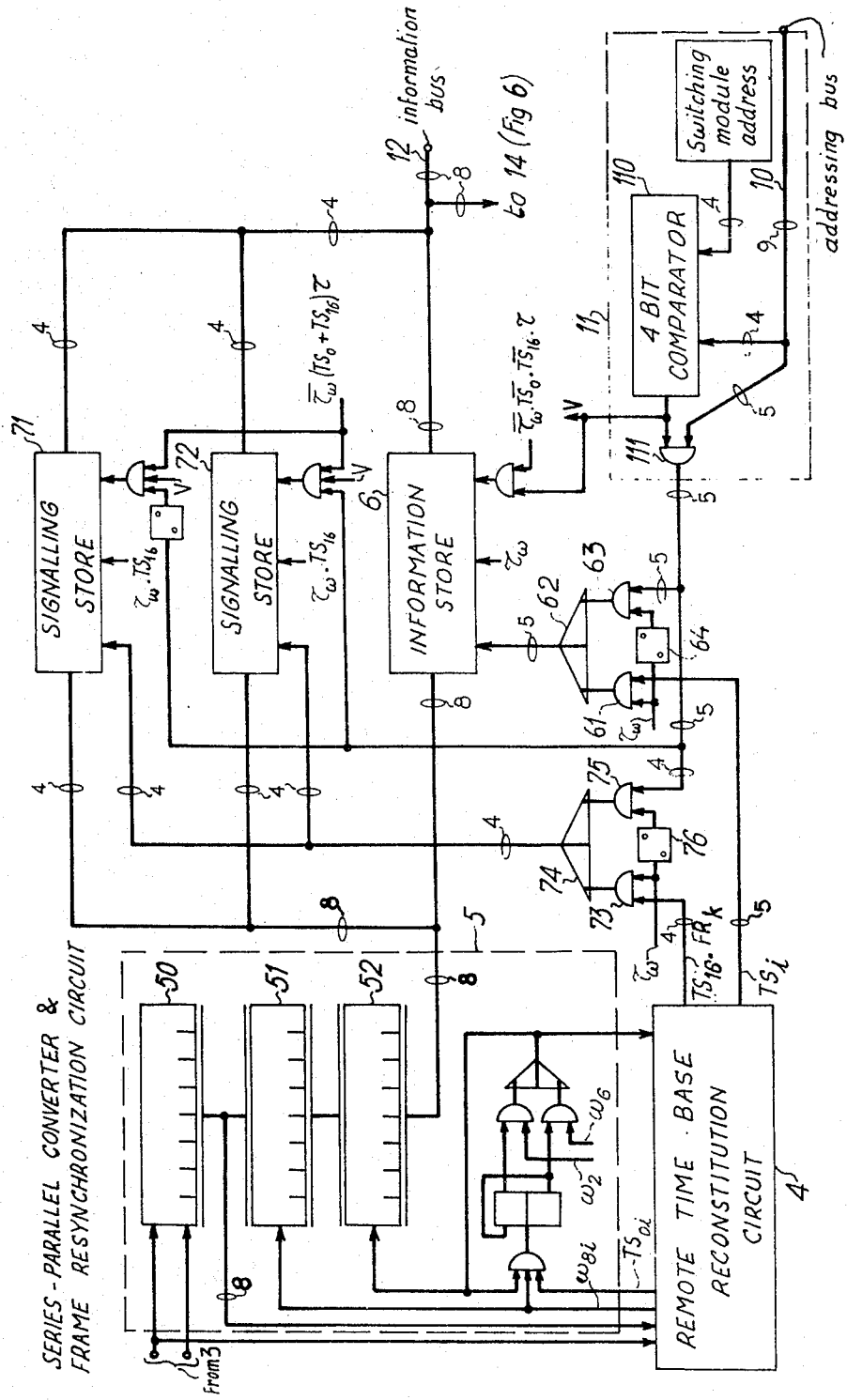
FIG. 4 illustrates the switching unit in a more complete form.

Referring now to FIG. 4, it again shows the circuit for the reconstitution of the remote time base 4, the series-parallel converter 5, the information buffer store 6, the signalling buffer store 7 which is here divided into two stores 71 and 72, the addressing busbar 10 and the control selector 11. The capacity of the store 6 is 32 words of eight bits and the capacity of the stores 71 and 72 is 16 words of four bits for each.

So far as the writing addressing is concerned, the address is transmitted to the addressing inputs of the stores 6, 71 and 72 by the circuit for the reconstitution of the remote time base 4 because corresponding to such an addressing circuit 4 there is only one store 6 and a single pair of stores 71 and 72.

The five-bit address of the information octet to be written is applied to the write-addressing input of the information store 6 through the AND-gate 61, open at the time of writing $\tau_w$, and the OR-gate 62.

The four-bit address of the signalling octet situated in the time slot $TS_{16}$ which has to be written (address of this $TS_{16}$ in the multiframe) is applied to the write-addressing input of the signalling stores 71 and 72 through the AND-gate 73, open at the time $\tau_w$, and the OR-gate 74. The first demi-octet is written in the store 71 and the second demi-octet is written in the store 72.

So far as the reading addressing is concerned, the address is supplied at each elemental moment $\tau$ by the control store 8 over the addressing busbar 10.

The four bits of heavy weight of the reading address, designating one of the possible addresses $p$ of an incoming multiplex digital circuit, that is to say one of the possible addresses of a switching module, are applied to a comparator 110 which receives from a register not illustrated, the address of the module concerned. When there is identity between the address on the addressing busbar and the address stored in the register, the comparator authorizes the reading of the information and signalling stores of this module and releases the AND-gate 111 through which the five bits of low weight of the reading address are applied to the read addressing terminals of the stores.

Thus, at each elemental moment $\tau$ reserved for the reading a single switching module is selected. Only the reading of the stores of this module is validated by the output V of the control selector.

The five-bit reading address of the information octet is applied to the read adressing input of the store 6 through the AND-gate 63, open at the time of reading $\overline{\tau}_w$ (supplied by the inverter 64) and the OR-gate 62.

The four-bit reading address of the signalling demi-octet is applied to the read addressing inputs of the signalling stores 71 and 72 through the AND-gate 75, open at the time of reading $\overline{\tau}_w$ (supplied by the inverter 76) and the OR-gate 74. Since the demioctets are in different stores 71 or 72, the fifth bit of the address activates one or the other of these stores.

The writing moments are $\overline{TS}_{16}.\tau_w$ for the information store 6 and $TS_{16}.\tau_w$ for the signalling stores 71 and 72.

The possible reading moments are $\tau.\overline{\tau}_w.\overline{TS}_0.\overline{TS}_{16}$ for the information store 6 and $\tau.\overline{\tau}_w [TS_0 + TS_{16}]$ for the signalling stores 71 and 72, it being understood that there are 16 reading moments $\tau$ for each time slot. In this manner, at each moment $\tau$, a single store is read out of the switching module selected, either the information store during the time slots $TS_1$ to $TS_{15}$ and $TS_{17}$ to $TS_{31}$ or the signalling stores during the time slots $TS_0$ and $TS_{16}$.

The real reading moments are $\tau_q.\overline{\tau}_w.\overline{TS}_0.\overline{TS}_{16}$ for the information store 6 and $\tau_q.\overline{\tau}_w [TS_0 + TS_{16}]$ for the signalling stores 71 and 72 in which the moment $\tau_q = \tau.V$ is variable in the time slot according to the outgoing multiplex digital circuit into a channel of which the information octet or the signalling demi-octet has to be transferred.

The information read is available on the information busbar 12. It will be seen that the reading rate is the same for the information and the signalling stores: sixteen reading operations per time slot.

Apart from its function of serial-parallel conversion, the series-parallel converter 5 ensures the resynchronisation of the incoming frame with the local time base 9. It comprises, as is well known in the subject of time-division switching, a serial input register 50, a parallel buffer register 51 and a parallel output register 52. When the serial register 50 has received an octet, its contents is transferred to the buffer register 51 at a moment $\omega_8$ given by the circuit for the reconstitution of the remote clock 4. At each interval of time of the local time base 9, the contents of the buffer register 51 is transferred to the output register 52, the moment of transfer being $\omega_2$ or $\omega_6$ according to the phase displacement between the time slot corresponding to the remote time base and the time slot corresponding to the local time base. It is not necessary to describe this resynchronisation operation in more detail and for this purpose reference may be made to the U.S. Pat. No. 3,928,727 granted to Alain Y. ROCHE.

Figure 6:
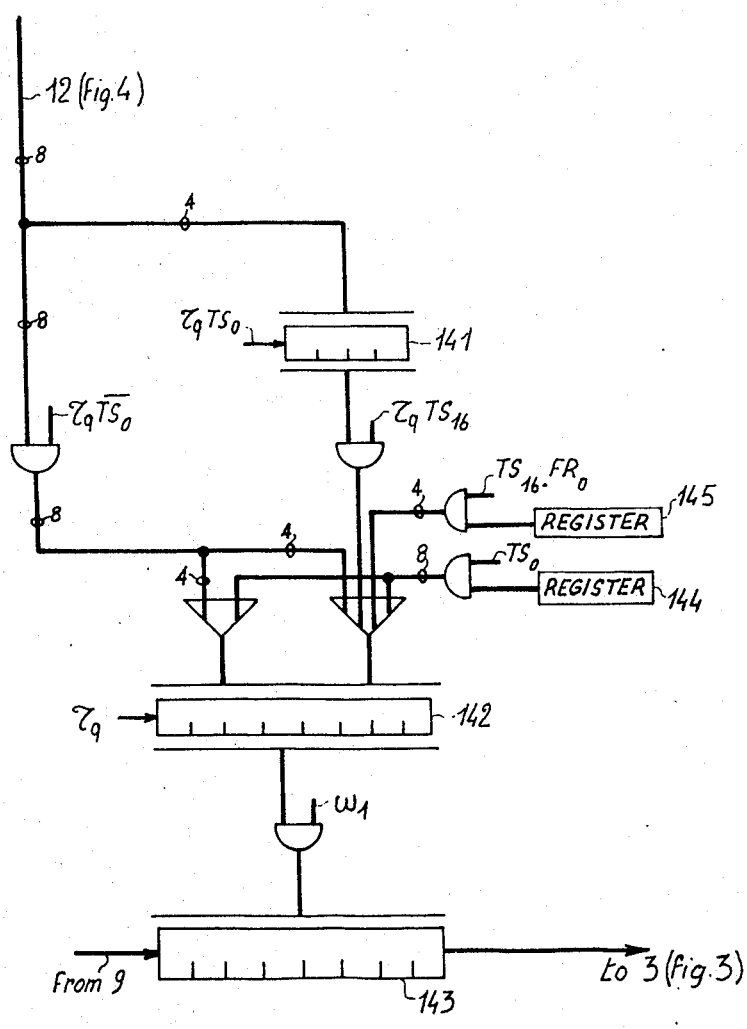
FIG. 6 illustrates the output parallel-series converter.

Apart from its function of parallel-series conversion, the parallel-series converter 14 (FIG. 6) ensures the storing of the signalling demi-octet read during the time slot $TS_0$ and brings it into parallel with the signalling demi-octet read during the time slot $TS_{16}$. This converter comprises a four-bit buffer register 141 (FIG. 6), open at the moment $\tau_j TS_0$ for the temporary storage of the demi-octet read at $TS_0$, an eight-bit buffer register 142, the access to which is open to the eight wires of the busbar at the moments $\tau_j\overline{TS}_0$ to receive the information octets (except during $TS_{16}$) and the access to which is open to four wires of the busbar and to the four outputs of the register 141 at the moments $\tau_j TS_{16}$ to receive on the one hand the signalling demi-octet read at this moment and on the other hand that read at $\tau_j TS_0$ and stored in register 141.

At the interval of time $\tau_j.TS_0$ and $\tau_j TS_{16} FR_0$, the frame locking and multiframe locking octets produced in the registers 144 and 145 are introduced into the buffer register 142. At the moment $\omega_1$ following the moment $\tau_j$ ($\omega_1$ is the same for all the outgoing multiplex digital circuits) the contents of the buffer register 142 is transferred to the output register 143 from which the bits are transmitted in series to the code converter 3.

Figure 5:
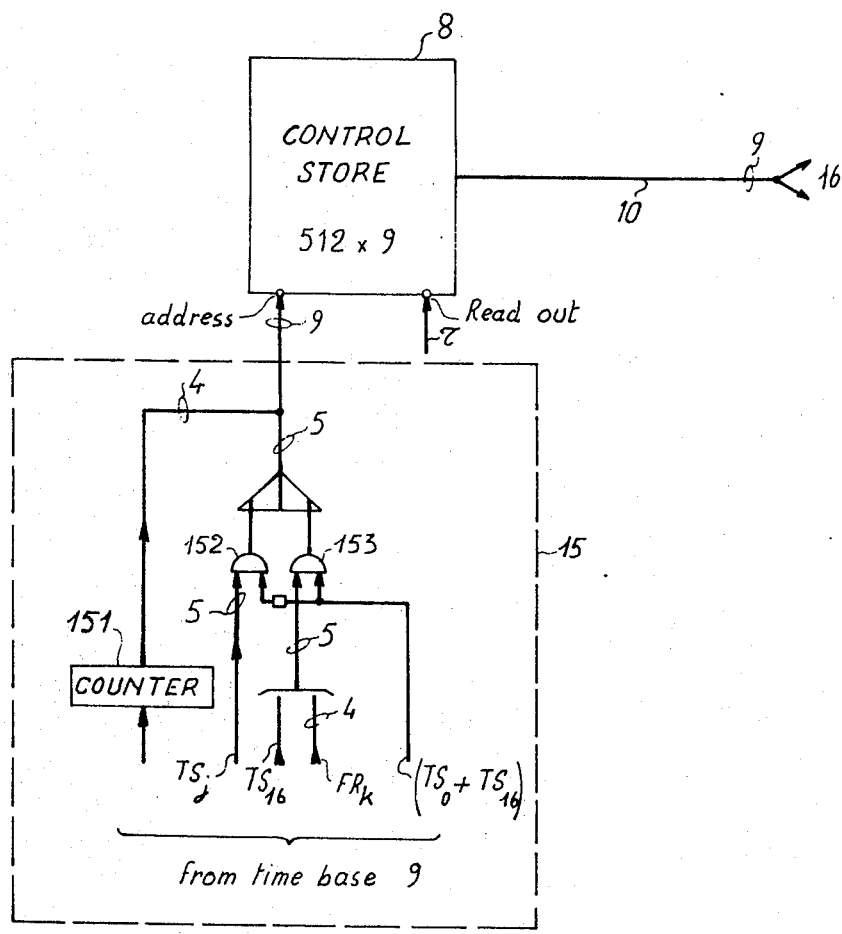
FIG. 5 illustrates the control store.

Referring now to FIG. 5, the control store 8, the addressing busbar 10 and the address counter or selector 15 of this control store are illustrated. This address selector comprises a counter 151 counting from 0 to 15 and then supplying 4 bits at each elemental time $\tau$ defining the address q out of 16 of an outgoing multiplex digital circuit $O_q$ and a logic circuit supplying 5 bits. So far as the information octets are concerned, these five bits define the number j out of 32 of the digital channel concerned in the multiplex digital circuit $O_q$, that is to say the time slot $TS_j$. So far as the signalling demi-octets are concerned, four of the five bits define the number of the $TS_{16}$ in the multiframe, that is to say $(TS_{16})FR_k$ (k comprised between 0 and 15) and one bit defines whether it is a question of the first demi-octet or the second demi-octet of an octet of $TS_{16}$.

The logic circuit comprises five AND-gates 152 receiving the signals $TS_j$ from the time base 9 and open at $(TS_0 + TS_{16})$ and five gates 153 receiving the signals $(TS_{16})FR_k$ from the time base 9 and open at $(TS_0 + TS_{16})$.

It is now clear that the invention relates to a system of transfer from digital channels of an incoming multiplex digital circuit to an outgoing multiplex digital circuit which effects the transfer of information and of the signalling of said digital channels at a constant speed of transfer although the information and the signalling do not have either the same format or the same repetition rate.

It is to be understood that the switching system above described is only exemplary. The format of the signalling words was half the format of the information words and there was one unused time slot in the frame (the frame locking time slot). The reading out rate from the information buffer store and the reading out rate from the signalling buffer store were equalized by reading out the signalling buffer store at the rate of the information buffer store during two time slots, the signalling time slot and the unused time slot. If, for example, the information words are nine-bit words and the signalling words are three-bit words which are grouped per three in one signalling time slot in each frame, the signalling reading out rate must be three times the information reading out rate. The signalling reading out rate will be made equal to the information reading out rate by reading out the signalling buffer store at the rate of the information buffer store during the signalling time slot and two unused time slots in the frame. Of course, in that case, the outgoing signalling words would have to be reconstituted from three parts and not from two parts as in FIG. 6.

What we claim is:

1. A switching unit for a multiplex pulse code modulation transmission network formed by incoming multiplex digital circuits and outgoing multiplex digital circuits, said incoming and outgoing multiplex digital circuits being divided into a number of recurrent non-information conveying time slots having a first recurrence period, recurrent information time slots having said first recurrence period and conveying information words of a first format, and recurrent signalling time slots having a second recurrence period and each conveying a predetermined number of signalling words of a second format grouped in signalling word groups, an information word in a given information time slot being associated with a signalling word in a given signalling time slot for forming the information data and the signalling data of one and the same given component digital channel and the number of signalling words in a signalling word group being one unit higher than the number of non-information conveying time slots, said switching unit comprising information stores connected to said incoming and outgoing multiplex digital circuits, signalling stores connected to said incoming and outgoing multiplex digital circuits, means for writing in said information stores the information words contained in the information time slots of said incoming multiplex digital circuits at addresses dependent on the serial number of the information time slots which convey them, means for reading out of said information stores, at a given rate, the information words contained therein at addresses dependent on the serial number of the information time slots of the outgoing multiplex digital circuits which they are to be switched to, means for writing in said signalling stores the signalling words contained in the signalling time slots of said incoming multiplex digital circuits at addresses dependent on both the serial number of the signalling time slots which convey them and the serial number of each signalling word in the signalling word group which contains it, means for reading out of said signalling stores, at the same given rate, during the non-information conveying time slots and signalling time slots, the signalling words contained therein at addresses depending on both the serial number of the signalling time slots of the outgoing multiplex digital circuits which they are to be switched to and the serial number of each signalling word in the signalling word group which has to contain it, means for storing the signalling words read out during the non-informative conveying time slots and means for forming signalling word groups from said stored signalling words and said signalling words read out during the signalling time slots.

2. A switching unit for a multiplex pulse code modulation transmission network as set forth in claim 1 in which the recurrent information and signalling time slots are grouped in frames, each of said frames including a frame locking time slot, in which the signalling word groups each comprise two signalling words and in which the signalling words contained in the signalling stores are read out during the frame locking time slots taken as non-information conveying time slots and the signalling time slots.

3. A switching unit for a multiplex pulse code modulation transmission network as set forth in claim 1 in which the information words are eight-bit words and the signalling words are four-bit words grouped by two in the signalling word groups.

* * * * *